United States Patent Office
3,509,247
Patented Apr. 28, 1970

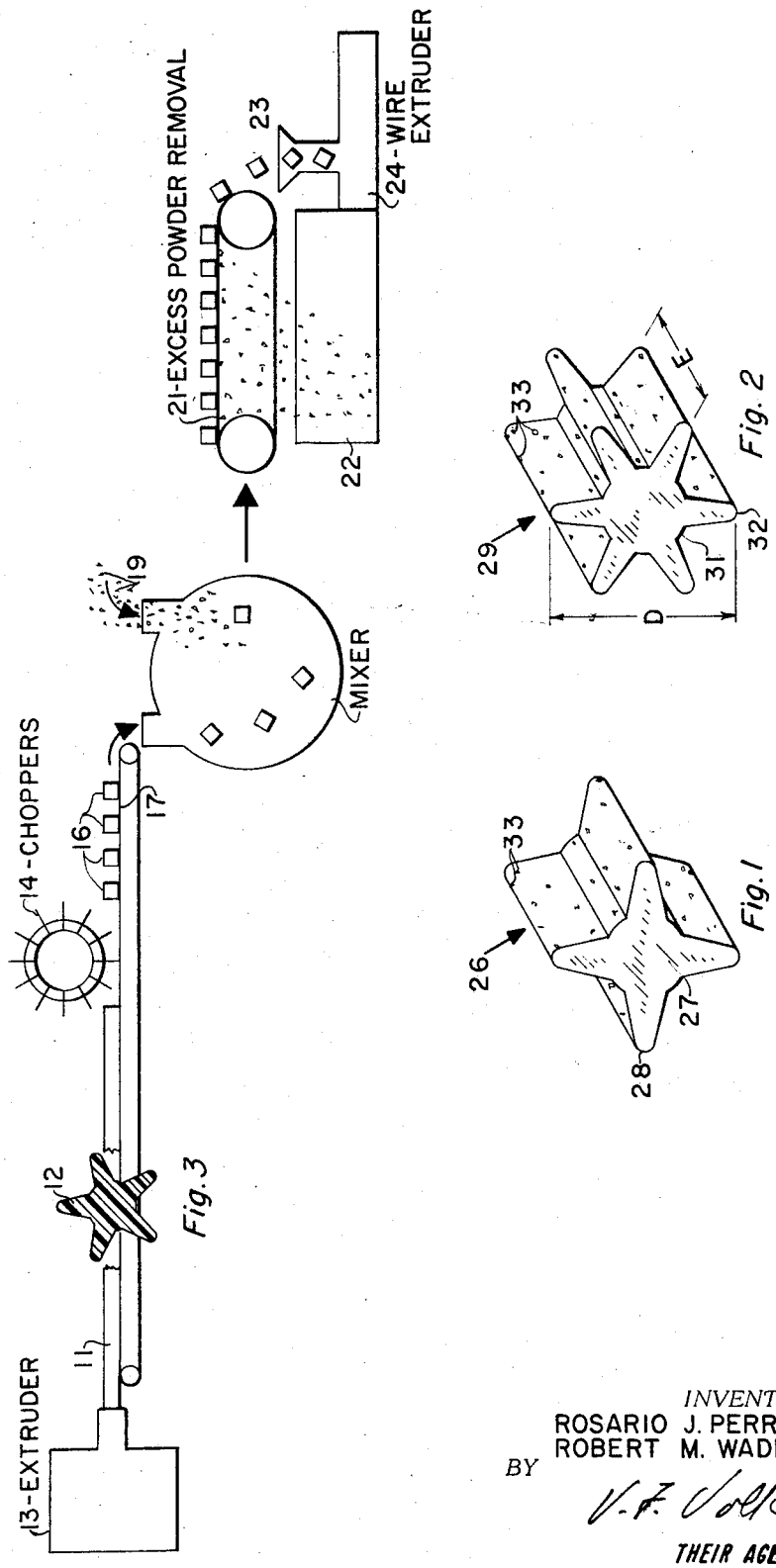

3,509,247
EXTRUSION METHOD
Rosario J. Perrone, Marion, and Robert M. Wade, Wabash, Ind., assignors to Anaconda Wire and Cable Company, a corporation of Delaware
Filed Sept. 11, 1967, Ser. No. 666,574
Int. Cl. B29c 17/14; B44d 1/02; B29f 3/00
U.S. Cl. 264—131                                6 Claims

ABSTRACT OF THE DISCLOSURE

Rubber or plastic pellets for use in a mixing extruder are fluted, with the number and depth of the flutes providing the proper surface to volume ratio for dusting or wetting with one of the components of the composition, such as a curing agent or colorant.

BACKGROUND OF THE INVENTION

Our invention relates to the extrusion of rubber or plastic materials, referred to hereafter by the term "rubber-like." One important case of such extrusion resides in the application of insulation to electric conductors. The rubber-like material is fed into the extruder in the form of pellets and the mixing of these pellets with other components of the desired final composition takes place in the extruder itself. To assure the proper proportions of ingredients, the components such as curing agents, colorants, gassing agents, etc., must be accurately metered into the extruder hopper. This is not easily done, particularly if the extrusion is frequently interrupted and if the quantity of the added component is relatively small. It has been suggested that the added components, particularly pigments, might be added uniformly by coating them on the surface of the pellets. Prior to the present invention this method has been unsatisfactory insofar as it has not permitted accurate metering of the quantity of the component added.

It is known, of course, that the surface to volume ratio of a given volume of material can be increased by reducing the size of the units into which the material is divided. This means cannot, however, be practically utilized to increase the surface area of rubber-like particles to be fed into an extruder since, for reasons of efficient handling and flow through the extruder hopper, there is an optimum particle diameter dimension. This dimension falls within about ⅛ to about ⅜ inch and it is not feasible to use very fine pellets for the purpose of increasing the area to volume ratio.

SUMMARY

We have solved these problems by forming the pellets with a surface to volume ratio selected to have the proper proportion of an added component adhere to its surface. This cannot be done merely by changing the size of the pellets since pellets that are too small or too large will not feed smoothly into an extrusion hopper. The best pellet shape from the point of view of hopper feed, is one such as a sphere, cube, or cylinder where the length equals the diameter. Flakes and long rods are not desirable. We extrude a continuous strand of the rubber-like material with a fluted cross-section, by which we mean that the cross-section comprises a hub with at least three flutes extending radially therefrom, and then chop the strand into pellets with a length approximately equal to their diameter. We mix these pellets with a supply of the component to be added so as to coat the surfaces with the component, then remove the excess of component and feed the pellets into an extruder hopper. In the extruder the component is thoroughly blended into the rubber-like material in a known manner. Extruders of several types are well known that are particularly designed to accomplish a thorough mastication and blending of the stock material.

BRIEF DESCRIPTION OF THE DRAWING

FIGURE 1 shows a pellet with four flutes made in accordance with our invention.
FIGURE 2 shows a pellet with six flutes made in accordance with our invention.
FIGURE 3 represents schematically a method of our invention.

DESCRIPTION OF THE PREFERRED EMBODIMENT

We refer first to FIGURE 3 since the utility of our invention can best be understood from a description of the process. A rubber-like extrudate 11 shown in enlarged section at 12 is extruded from a rubber or plastic extruder 13 of known type in a continuous length and is passed under a chopping wheel 14 which cuts it into pellets 16 having a length approximately equal to their sectional span (indicated as D in FIGURE 2). The pellets are carried forward by a conveyor 17 whence they are introduced into a rotating drum mixer 18 along with a supply 19 of the powdered constituent. In order that excess powder may be removed from the pellets 16 they are conveyed to an extruder 24 on a perforated belt 21 through which the excess powder can be collected in a bin 22. Where the quantity of the component 19 added to the mixer 18 does not provide any excess powder the step of removing the excess can be omitted. To enter the extruder 24 the pellets 16, covered with the component 19, are fed into a hopper 23. Within the extruder 24 there is a worm of which a number of satisfactory types are known, and which is not shown in the drawing, acting within a known type of cylinder, also not shown, wherein the component 19 is thoroughly dispersed in the softened rubber-like composition formed from the pellets 16.

Although we have shown the component 19 added in the form of a powder it will be understood the component may be a liquid. This liquid may itself be the active component or a solid component may be dissolved in a siutable liquid carrier such as a plasticizer or lubricant for the rubber-like material.

With reference to FIGURES 1 and 2 it can be seen that our invention provides a means for changing the surface to volume ratio while still maintaining the optimum length to diameter ratio required for flowing pellets into a hopper. In FIGURE 1 a pellet, indicated by the numeral 26, is comprised, in section, of a hub 27 and four flutes 28 extending radially from the hub. In FIGURE 2 another pellet 29, the same volume as the pellet 26, has a hub 31 and six radially extending flutes 32. It is clear from the drawing that the pellet 29 has a greater surface for picking up powder than the pellet 26. In each case we have preferred to make the length E of the pellet about equal to the diameter D and to make the flutes of equal radial extension. As shown in the drawing the pellets 26, 29 have been dusted with a powder 33 of a chemical component but our invention is also effective when the component is a liquid, preferably oily and non-volatile.

As an example of the utility of our invention we cite the case of the addition of dicumyl peroxide powder as a curing agent for ethylene propylene rubber terpolymer. When it was attempted to add about 1.5% of this peroxide to the surface of the terpolymer in the form of spheres of about ¼ inch diameter the spheres did not pick up all the powder but when the terpolymer was extruded in a form having a hub and five flutes all the peroxide was taken up without difficulty and the pellets fed into an extruder.

In another example, fluted pellets of chlorosulfonated polyethylene readily picked up on their surface a powdered curing agent consisting of dipentamethylenethiuramtetrasulfide, benzothiazyl disulfide, and a curing promoter (Du Pont's LD339) in equal parts.

We claim:
1. The method of extruding a composition comprising a small proportion of at least one essential component, comprising the steps of:
   (A) extruding a continuous strand of rubber-like material,
   (B) said strand being extruded in the form of a hub with at least three flutes projecting from said hub to provide a surface to volume ratio required to deposit a selected quantity of said component,
   (C) dividing said strand into pellets having a length approximately equal to their diameter,
   (D) mixing said pellets with a supply of said component so as to coat the surface of said pellets with said component,
   (E) feeding said coated pellets into a mixing extruder,
   (F) thoroughly blending said component into said rubber-like material within said extruder, and extruding said composition.
2. The method of claim 1 wherein said component comprises a curing agent for said rubber-like material.
3. The method of claim 1 wherein said component comprises a colorant.
4. The method of claim 1 wherein said component comprises a powder.
5. The method of claim 1 wherein said component comprises a liquid.
6. The method of claim 1 comprising the step of separating the coated pellets from an excess of said component.

References Cited
UNITED STATES PATENTS

| | | | |
|---|---|---|---|
| 1,773,969 | 8/1930 | Dreyfus | 264—177 |
| 2,345,533 | 3/1944 | Graves | 264—131 |
| 2,900,668 | 8/1959 | Hubner | 264—142 |
| 3,033,806 | 5/1962 | Spencer | 264—51 |
| 3,185,588 | 5/1965 | Resnick. | |
| 3,188,264 | 6/1965 | Holden | 264—51 |
| 3,198,859 | 8/1965 | Tomlinson | 264—55 |
| 3,340,339 | 9/1967 | Ullman | 264—131 |
| 3,351,601 | 11/1967 | Blaga. | |
| 3,387,067 | 6/1968 | McCurdy | 264—53 |

FOREIGN PATENTS 1,041,014  9/1966  Great Britain.

ROBERT F. WHITE, Primary Examiner
A. M. SOKAL, Assistant Examiner

U.S. Cl. X.R.
117—100; 264—78, 134, 142, 143